(12) United States Patent
Waldorf

(10) Patent No.: US 8,489,447 B1
(45) Date of Patent: Jul. 16, 2013

(54) ADJUSTING PRICE FOR A SALES LEAD IN AN ONLINE MARKET FOR SALES LEADS

(75) Inventor: Mel R. Waldorf, Alameda, CA (US)

(73) Assignee: Bluesky Marketing Group, Inc., San Ramon, CA (US)

( * ) Notice: Subject to any disclaimer, the term of this patent is extended or adjusted under 35 U.S.C. 154(b) by 793 days.

(21) Appl. No.: 12/134,155

(22) Filed: Jun. 5, 2008

Related U.S. Application Data

(60) Provisional application No. 60/933,415, filed on Jun. 5, 2007.

(51) Int. Cl.
*G06Q 99/00* (2006.01)

(52) U.S. Cl.
USPC .................. 705/7.35; 705/7.29; 705/7.31

(58) Field of Classification Search
USPC ....................... 705/7.29, 7.31, 7.35
See application file for complete search history.

(56) References Cited

U.S. PATENT DOCUMENTS

| | | | |
|---|---|---|---|
| 2007/0027746 A1* | 2/2007 | Grabowich | 705/10 |
| 2007/0112582 A1* | 5/2007 | Fenlon | 705/1 |
| 2011/0099081 A1* | 4/2011 | Pettersen et al. | 705/26.3 |

* cited by examiner

Primary Examiner — Akiba Allen
(74) Attorney, Agent, or Firm — Morrison & Foerster LLP

(57) ABSTRACT

A computer enabled method adjusts a price to be offered to a buyer for a sales lead in an online market for sales leads based upon past performance of the buyer. The method determines a projected percent to cap value for the buyer based upon a rate at which the buyer is accepting sales leads in a current billing period, determines an opportunity performance value associated with the buyer based upon a ratio of received offers to accepted proposals for offers; determines a delta amount based upon the percent to cap value and the opportunity performance value; and adjusts the price to be offered for the sales lead by the delta amount. A maximum cost percentage value that limits the price to be offered is generated based upon the projected percentage to cap value and the number of sales leads the buyer is projected to purchase in a billing period.

16 Claims, 7 Drawing Sheets

300

| DealerProduct | | | | | | | | | |
|---|---|---|---|---|---|---|---|---|---|
| 302 | 304 | 306 | 308 | 310 | 312 | 313 | 314 | 316 | 318 |
| DealerId | ProductId | Rate | Routing Rate | Cap | Count | Min. Income | Regulator | PPTC | MCP |
|  |  |  |  |  |  |  |  |  |  |

| DynamicPingDlr | | | |
|---|---|---|---|
| 332 | 334 | 336 | 338 |
| DealerId | SourceId | Cost | IsManual |
|  |  |  |  |

FIG. 3B

ADJUSTING PRICE FOR A SALES LEAD IN AN ONLINE MARKET FOR SALES LEADS

CROSS REFERENCE TO RELATED APPLICATION

The present application claims the benefit under 35 USC §119(e) to U.S. Provisional Application Ser. No. 60/933,415, filed Jun. 5, 2007, which is incorporated herein by reference in its entirety.

BACKGROUND

1. Field

The present application relates generally to an online market for sales leads, and, more particularly, to adjusting price for a sales lead in the online market.

2. Related Art

A sales lead represents potential customers for companies in particular markets for particular goods and/or services. A sales lead typically describes a potential customer, and includes information such as a name, address, social security number, and income.

Sales leads can be gathered from the Internet by other companies, which are referred to as "sales lead generators." Sales lead generators may gather sales leads by, for example, performing Internet searches with specialized search strings. As another example, if a person searches for "auto financing" in a search engine, the person is identified as a sales lead because they are looking for auto financing. The sales lead generators may then sell the sales leads to companies in the relevant markets.

As an example, the automobile financing market involves matching potential automobile buyers with lenders that provide credit on terms acceptable to the potential automobile buyers. Automobile dealers often act as intermediaries between automobile buyers and lenders when selling automobiles, and often have their own financing departments. The dealers are interested in acquiring sales leads that identify potential automobile buyers who are also candidates for financing. Such sales leads may represent applications for credit or for sales of other types. Sales leads have a monetary value to automobile dealers, and the dealers may buy and sell the leads in an online market. The dealers are therefore buyers of sales leads for automotive financing. A sales lead is also referred to as an application or "app" in the auto-financing market because a sales lead is often associated with a credit application by a person interested in purchasing a car.

"A sales lead provider" is a company that buys sales leads from sales lead generators and sells the sales leads to buyers such as automobile dealers and wholesale buyers. Multiple sales lead providers compete to buy and sell the sales leads.

Sales leads can be sold online using a ping/post system as shown in FIG. 1. The sales leads may be sold exclusively, so that a seller only sells the sales lead to one buyer. The seller 102, or "source", sends to the buyer A 104, buyer B 106, and buyer C 108 a "ping," which can include demographic information that characterizes the sales lead. The demographic information may include, for example, a zip code and, in some examples, a Social Security number and an income. Buyer A 104, buyer B 106, and buyer C 108 can then respond with an indication of whether they are interested in the sales lead. Depending on the technology of the seller and the buyers, the buyer may respond with a price or a "tier" that corresponds to a price.

Three response types may be sent in the example system of FIG. 1. In the first type, sent to buyer A 104, fixed price (standard), the response is Success or Failure, and the price is static and predetermined. In the second type, tier, which is sent to buyer B 106, the response is Success or Failure. On Success a Tier number is returned, and the tier number corresponds to a price. In the third type, price, sent to buyer C 108, the response is Success/Failure. On Success a price in dollars and cents is returned.

After all buyer responses are returned, the seller selects a buyer to whom the seller will offer the sales lead for sale at the price indicated, implicitly or explicitly, by the buyer's previous ping response. This offer is referred to as a "post". The selection of a buyer may be based on price, post conversion, a "buddy system" or other factors. Post conversion is determined by the number of times the seller has posted to a buyer that the buyer has accepted the sales lead. On receiving the full sales lead post, the selected buyer performs validation and determines whether to accept or reject the sales lead. Validation may include checking for required fields, Social Security number validation, phone number validation, and other evaluations.

A sales lead provider such as the seller 102 competes with other sales lead providers for available sales leads. In order to buy sales leads so that it can supply buyers, the sales lead provider bids up prices, but in order to operate profitably, the sales lead provider buys the sales leads at low prices. It would be desirable, therefore, to automatically manage bids to balance supply with profits.

SUMMARY

In general, in a first aspect, the invention features a computer enabled method of adjusting a price to be offered to a buyer for a sales lead in an online market for sales leads. The price is adjusted based upon past performance of the buyer. The method includes determining a projected percent to cap value for the buyer based upon a rate at which the buyer is accepting sales leads in a current billing period, determining an opportunity performance value associated with the buyer based upon a ratio of received posts to accepted pings, determining a delta amount based upon the percent to cap value and the opportunity performance value, and adjusting the price to be offered for the sales lead by the delta amount.

Embodiments of the invention may include one or more of the following features. The method may include receiving a ping request from a seller, wherein the ping request includes demographic information associated with the sales lead, and identifying a buyer, wherein the buyer is associated with the demographic information, the buyer accepts sales leads having the income associated with the sales lead, and the buyer is under its cap.

The demographic information may include a zip code, a social security number, an income, or a combination thereof. The method may include generating a ping response for dynamic price sources, wherein if the buyer is successfully identified, the ping response indicates success and includes the price to be offered. The method may include storing the price to be offered in a memory location in association with the buyer. The sales lead may include an application for credit. The buyer may include an automobile dealer. The projected percent to cap value may be based upon the number of sales leads accepted by a buyer in the current billing period and upon a cap associated with the buyer. Determining the projected percent to cap value may include multiplying a current sales lead count by the number of days in the current billing period to obtain a first result, dividing the first result by the current numeric day of the current billing period to obtain a second result, and dividing the second result by a cap associated with the buyer.

Determining the opportunity performance value associated with the buyer may include dividing a number of posts received from the buyer by a number of pings accepted from the buyer. Determining the delta amount may include selecting a row from a table, where the projected percent to cap value is between a first upper bound and a first lower bound associated with the row, and where the opportunity performance value is between a second upper bound and a second lower bound associated with the row, and wherein the delta amount is associated with the row. Adjusting the price of the sales lead by the delta amount may include adding the delta amount to the price of the sales lead. The method may further include setting the price of the sales lead to a maximum cost percentage value if the price of the sales lead is greater than the maximum cost percentage value.

The method may further include increasing the price by an incremental factor if a margin associated with the buyer is within a first percentage of a standard margin, the opportunity performance value is less than a second percentage, and the percent to cap value is greater than a cap threshold. The incremental factor may be a fraction of a dollar, the first percentage may be between 1% and 10%, the second percentage may be between 1% and 10%, and the cap threshold may be between 80% and 100%.

In general, in a second aspect, the invention features a computer-enabled method of generating a maximum cost percentage value for use in determining whether to sell a sales lead to a buyer in an online market for sales leads. The method includes determining a projected percentage to cap value for the buyer; if the projected percentage to cap value substantially corresponds to 100%, generating a maximum cost percentage value based upon a ratio of cost per sales lead to fees per sales lead; and if the projected percentage to cap value is substantially less than 100%, determining a projected net income for a current billing period based upon number of sales leads the buyer is projected to purchase in the current billing period at the buyer's current purchase rate, determining a cost per sales lead that would produce the projected net income if the buyer were to meet its cap on purchased sales leads in the current billing period, and determining the maximum cost percentage value by dividing the cost per sales lead by the fee per sales lead.

Embodiments of the invention may include one or more of the following features. Generating the maximum cost percentage value may include adding average cost per sales lead to standard deviation of the cost per sales lead for the buyer in the current billing period and dividing the result by average fee per sales lead. Determining the projected net income may include multiplying average net income per sales lead by number of sales leads projected to be received in the current billing period, where the average net income per sales lead is determined by subtracting average cost per sales lead and a sales commission from average fee per sales lead.

Determining the cost per sales lead that would produce the projected net income if the buyer were to meet its cap may include subtracting a sales commission and a capped net income per sales lead from average fee per sales lead, wherein the capped net income per sales lead is determined by dividing the projected net income by the buyer's cap. The method of generating a maximum cost percentage value may further include adjusting the price to be offered to the buyer for the sales lead to equal the lesser of (i) price to be offered plus standard deviation of the cost per sales lead for the buyer in the current billing period and (ii) the maximum cost percentage value.

In general, in a third aspect, the invention features a computer-enabled method of selecting a buyer to whom a sales lead will be offered for sale in an online market for sales leads. The method of selecting a buyer includes receiving a ping request from a seller, where the ping request includes demographic information associated with the sales lead; and identifying a buyer, where the buyer is associated with the demographic information, the buyer accepts sales leads having the income associated with the sales lead, the buyer is under its cap, and cost to buy the sales lead from the seller is less than a fee that the buyer will pay for the sales lead multiplied by a maximum cost percentage. Embodiments of the invention may include one or more of the following features. The demographic information may include a zip code, a social security number, an income, or a combination thereof.

The method of selecting a buyer may further include generating a ping response for fixed-price sources, where the ping response indicates success in response to successfully identifying, and the ping response indicates failure in response to not successfully identifying the buyer. The method of selecting a buyer may include retrieving a price to be offered from a memory location, wherein the memory location corresponds to the buyer; and generating a ping response in response to successfully identifying the buyer, wherein the ping response indicates success and includes the price to be offered.

The method of selecting a buyer may include retrieving a price to be offered from a memory location, wherein the memory location corresponds to the buyer; and generating a ping response in response to successfully identifying the buyer, wherein the ping response indicates success and includes a tier identifier based upon the price to be offered. The buyer may include an automobile dealer. Receiving the ping request may include verifying the authenticity of the demographic information.

In general, in a fourth aspect, the invention features a computer program product that includes program code for adjusting a price to be offered to a buyer for a sales lead in an online market for sales leads based upon past performance of the buyer. The computer program product includes program code operable to determine a projected percent to cap value for the buyer based upon a rate at which the buyer is accepting sales leads in a current billing period, program code operable to determine an opportunity performance value associated with the buyer based upon a ratio of received posts to accepted pings, program code operable to determine a delta amount based upon the percent to cap value and the opportunity performance value, and program code operable to adjust the price to be offered for the sales lead by the delta amount.

Embodiments of the invention may include one or more of the following features. The computer program product may further include program code operable to receive a ping request from a seller, wherein the ping request includes demographic information associated with the sales lead and program code operable to identify a buyer, where the buyer is associated with the demographic information, the buyer accepts sales leads having the income associated with the sales lead, and the buyer is under its cap.

In general, in a fifth aspect, the invention features a computer program product that includes program code for generating a maximum cost percentage value for use in determining whether to sell a sales lead to a buyer in an online market for sales leads. The computer program product includes program code operable to determine a projected percentage to cap value for the buyer, program code operable to generate a maximum cost percentage value based upon a ratio of cost per sales lead to fees per sales lead if the projected percentage to cap value substantially corresponds to 100%, and program code operable to: determine a projected net income for a current billing period based upon number of sales leads the buyer is projected to purchase in the current billing period at the buyer's current purchase rate, determine a cost per sales lead that would produce the projected net income if the buyer were to meet its cap on purchased sales leads in the current billing period, and determine the maximum cost percentage value by dividing the cost per sales lead by the fee per sales lead, if the projected percentage to cap value is substantially less than 100%.

In general, in a sixth aspect, the invention features a computer program product including program code for selecting a buyer to whom a sales lead will be offered for sale in an online market for sales leads. The computer program product includes program code operable to receive a ping request from a seller, where the ping request includes demographic information associated with the sales lead, and program code operable to identify a buyer, where the buyer is associated with the demographic information, the buyer accepts sales leads having the income associated with the sales lead, the buyer is under its cap, and cost to buy the sales lead from the seller is less than a fee that the buyer will pay for the sales lead multiplied by a maximum cost percentage.

BRIEF DESCRIPTION OF THE DRAWINGS

The present application can be best understood by reference to the following description taken in conjunction with the accompanying drawing figures, in which like parts may be referred to by like numerals:

FIG. 3A is an illustrative drawing of a Dealer Product table for storing dealer attributes in accordance with embodiments of the invention.

FIG. 3B is an illustrative drawing of a Dynamic Ping Dealer table for storing prices to be offered when buying sales leads from sources for particular source/dealer combinations in accordance with embodiments of the invention.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 2:
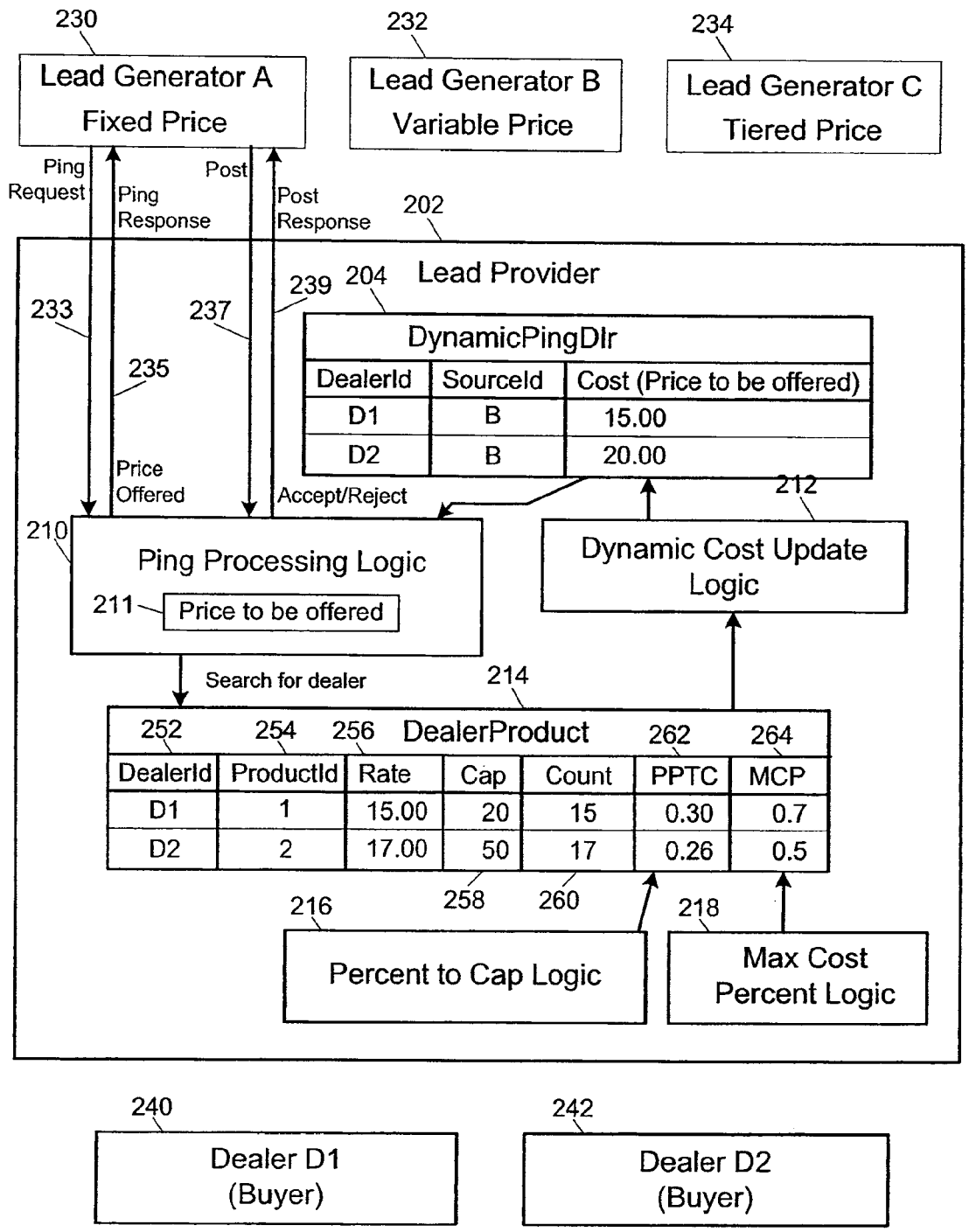
FIG. 2 is an illustrative drawing of sales lead providers interacting with sales lead generators and buyers in accordance with embodiments of the invention.

FIG. 2 is an illustrative drawing of sales lead providers interacting with sales lead generators and buyers in accordance with embodiments of the invention. A sales lead provider 202 is, in one example, implemented as a computer program running on a computer system. The sales lead provider 202 communicates with sales lead generator A 230, sales lead generator B 232, sales lead generator C 234, dealer D1 240, and dealer D2 242 via a communications network such as the Internet. In this example, the sales lead generator A 230 sends variable price sales leads (i.e., sales leads that include an explicit price value) to the sales lead provider 202. The lead generator A 230 sends each lead as a ping 233. The ping 233 may be understood as a start of negotiation for a possible sale of a sales lead from the sales lead generator A 230 to the sales lead provider 202. Ping processing logic 210 receives the ping 233 sent by the sales lead generator A 230, and performs processing as described below. In one example, a ping 233 is a message, typically sent via a computer network. A ping 233 may include demographic information about a sales lead, such as a person's name, password, zip code, Social Security number, and income.

Figure 1:
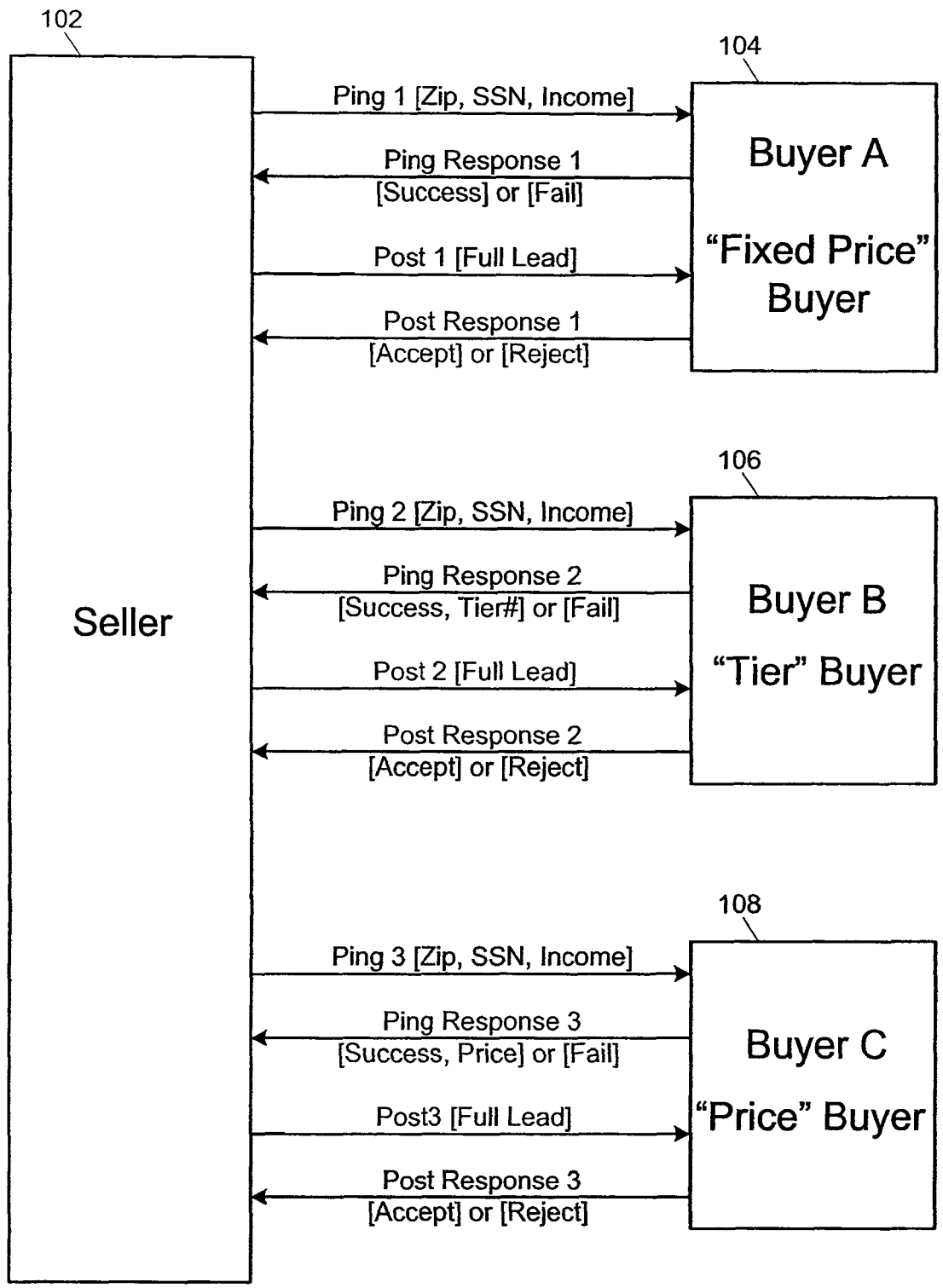
FIG. 1 is a prior art drawing of ping and post interactions between a seller and three buyers.

The ping processing logic 210 may determines an appropriate price 211 to be offered (i.e., bid) for the sales lead, or may decide not to continue negotiation, in which case a "fail" indicator is sent in a ping response 235. If the ping processing logic 210 decides to offer a price 211 (i.e., bid), the price 211 to be offered is determined based upon information in a Dealer Product table 214, as described below. The ping processing logic 210 then sends a ping response 235 to the lead generator 230 with a "success" indicator and an optional price indicator that corresponds to the price 211 to be offered, e.g., a tier or an explicit price, as described above with reference to FIG. 1. The lead generator 230 may subsequently send a post 237 to the lead provider 202 if the lead generator 230 decides to sell the sales lead to the lead provider 202. The post 237 may be understood as an offer to sell the sales lead to the lead provider 202. The lead provider 202 may accept the offer by sending a post response 239 with an "accept" indicator to the lead generator 230. Similarly, the lead provider 202 may reject the offer by sending a post response 239 with a "reject" indicator.

A row in the Dealer Product table 214 describes characteristics of a type of product, e.g., Internet sales leads (identified by the ProductId 254) ordered by an associated dealer such as the dealer D1 240. The associated dealer may be an automobile dealer or any other type of purchasing entity. The associated dealer is identified by the DealerId 252, and the product is identified by the ProductId 254. Each row in the Dealer Product table 214 also includes a Rate 256, Cap 258, Current Count 260, ProjectedPercentToCap (PPTC) 262, and MaxCostPercent (MCP) 264.

In one example, information in the Dealer Product table 214 applies to a current billing period. The billing period is typically one month, e.g., the current month, but other billing periods, such as a number of months or weeks, are possible. The current billing period is the billing period that is in progress when the process is executed, or another selected billing period for which the process is executed. The rate 256 represents the amount of money the dealer 240 will pay for each sales lead. The Cap 258 represents the number of sales leads a dealer has ordered for the current billing period. The Cap 258 is therefore the maximum number of leads that the dealer 240 will accept in the current billing period, and is an upper limit on the Current Count 260. The dealer 240 is said to be "under its cap" if the Current Count 260 of leads accepted by the dealer 240 is less than the dealer's Cap 258.

The projected percent to cap (PPTC) and maximum cost percent (MCP) are used to adjust the prices 211 of sales leads. The PPTC 262 represents the projected percentage of the sales lead Cap 258 that will be received in the current billing period for the associated dealer, assuming the current rate of lead acquisition. The MCP 264 represents a percentage of the Rate 256 that the sales lead provider 202 is willing to pay to purchase sales leads for the dealer identified by the DealerId 252.

Components of the lead provider 202, e.g., the ping processing logic 210, retrieve and modify the values in the Dealer Product table 214. In one example, Projected Percent to Cap logic 216 sets the PPTC value in the dealer product 214, and MaxCostPercent logic 218 sets the MCP value in the dealer product 214. A Dynamic Ping Dealer table 204 represents the cost (i.e., bid or price 211 to be offered to the seller) of sales leads for each dealer-seller pair in the Dynamic Ping Dealer table 204. Dynamic cost update logic 212 adjusts the cost in the Dynamic Ping Dealer table 204 to bid prices up (or down) as necessary to allow the sales lead provider 202 to buy sales leads so that it can supply buyers. The MCP value generated by the MaxCostPercent logic 218 mitigates this rise in bid prices by imposing an upper limit on the price that will be paid for a sales lead.

FIG. 3A is an illustrative drawing of a Dealer Product table 300 for storing dealer attributes in accordance with embodiments of the invention. In one example, Dealer Product table 300 includes information that the sales lead provider associates with each dealer. Dealer Product table 300 may be stored in a database. Dealer Product table 300 may be stored in, for example, a database server, e.g., Oracle® or the like, or in a memory, or in a disk file. In one example, the Dealer Product table 300 is a database table.

The Dealer Product table 300 can include a number of fields associated with various attributes. For example, DealerId 302 represents the dealer associated with a row in the database table. ProductId 304 represents a type of sales lead associated with the database row. A dealer may have multiple products. For example, a dealer may have an internet lead product, a direct mail product, and a television lead product. Rate 306 represents the amount paid by the dealer for sales leads. RoutingRate 308 is a value used in round-robin evaluation when two or more dealers share a territory. Cap 310 corresponds to the Cap 258 of the Dealer Product Table shown in FIG. 2. As described above, the Cap 310 is the number of sales leads the dealer has ordered. Current count 312 corresponds to the current count 260 of FIG. 2 and is the number of sales leads the dealer has received so far in the current billing period. Minimum income 313 is a threshold value and may be used to filter out ping requests having incomes less than the minimum income 313.

A regulator 314 may be used to spread sales lead flow throughout a month or other time period. The regulator 314 may impose a limit on the number of sales leads that the dealer can accept during a particular time period. PPTC value 316 represents the projected percentage of the sales lead Cap 310 that will be received in the current billing period assuming the current rate of lead acquisition. The PPTC value 316 corresponds to PPTC 262 of FIG. 2. MCP value 318 represents a percentage of the Rate 306 that the sales lead provider is willing to pay to purchase sales leads for the dealer. The MCP value 318 corresponds to MCP 264 of FIG. 2.

PPTC value 316 is calculated based on the current sales lead acceptance rate and regulator limits. Essentially, the current sales lead count is divided by the amount of elapsed days in the current month to produce a daily app count (i.e., sales lead count). The daily app count is then multiplied by the amount of days in the month to project the number of sales leads expected in the entire month. That is, the raw PPTC value is the current sales lead count multiplied by the days in the month, and divided by the days so far in the month and the cap. If the dealer has a regulator, the regulator may alter the raw PPTC value to limit the number of sales leads that can be provided, e.g., to ensure that sales leads are spread out over time according to the regulator's configuration. The goal is to meet 100% of the cap as soon as permitted by the regulator, and no later than the end of the month or sales period.

In one example, each dealer attribute in Dealer Product table 300 has a Cap 310, Rate 306, and MCP value 318. The MCP value 318 is the maximum amount that the sales lead provider is willing to pay to purchase sales leads for a given dealer. The term "MCP" as used herein may refer to a decimal percentage, or to a price calculated by multiplying a decimal percentage by a particular price. A ceiling MCP value limits the value of the MCP. The ceiling MCP value may be, for example, Rate—$7.50, Rate—$5.75, Rate—$6.25, Rate—$5.00, or any other value based on fixed expenses to our business. The ceiling MCP value may change, or may remain a fixed global value.

FIG. 3B is an illustrative drawing of a Dynamic Ping Dealer table 330 for storing prices to be offered when buying sales leads from sources for particular source/dealer combinations in accordance with embodiments of the invention. The Dynamic Ping Dealer table 330 may be stored in, for example, a database server, e.g., Oracle® or the like, or in a memory, or in a disk file. The Dynamic Ping Dealer table 330 includes a number of data columns. For example, DealerId column 332 may have values that represent dealers (i.e., buyers). SourceId column 334 may have values that represent sources (i.e., sellers). Cost column 336 may have values that represent a current bid, i.e., price to be offered to sellers, for sales leads to be bought from the source identified by the SourceId 334 and sold to the dealer identified by the DealerId 332. Multiple rows of such data may be present in the table 330. In one exemplary embodiment, the table contains at most one row per SourceId/DealerId pair.

Figure 4:
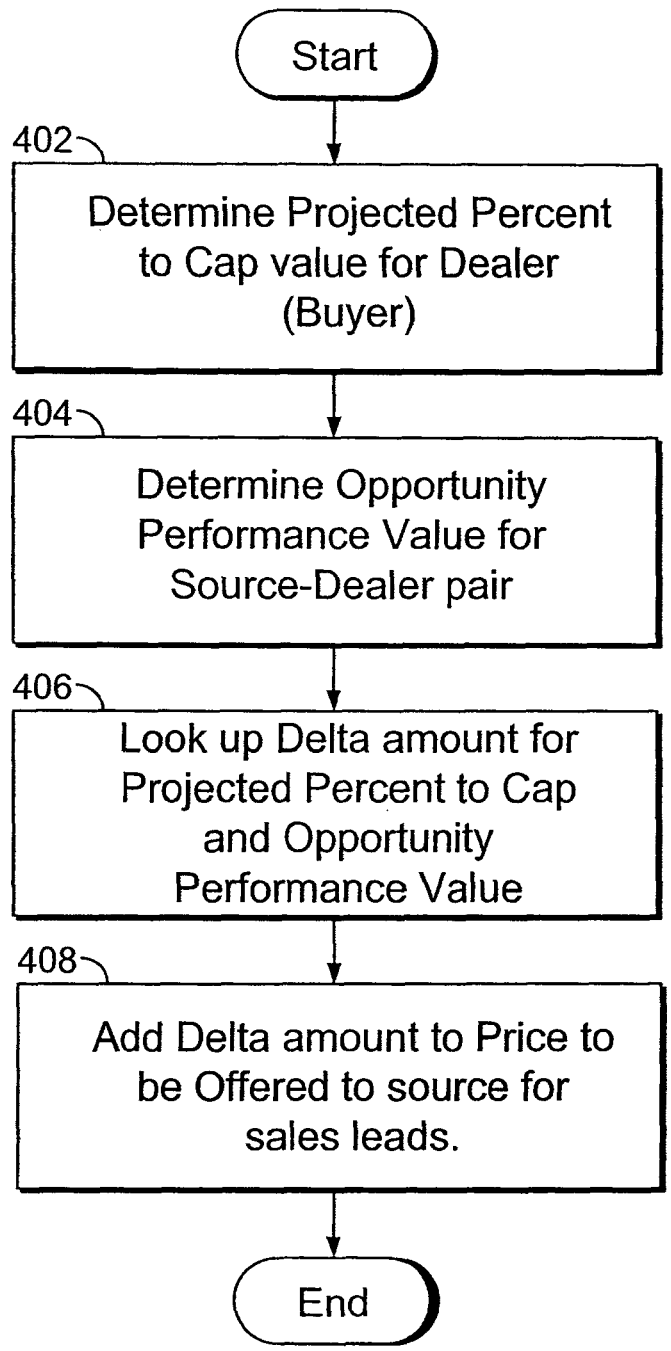
FIG. 4 is an illustrative flow diagram of a process for updating a price to be offered to a source for a sales lead for a particular source/dealer pair in accordance with embodiments of the invention.

FIG. 4 is an illustrative flow diagram of a process for updating a price to be offered to a source for a sales lead for a particular source/dealer pair in accordance with embodiments of the invention. In the cases where the sources accept a dynamic price/tier response to their pings, the sales lead provider tracks its performance with the individual sources to determine how much to bid. In one example, the process of FIG. 4 is executed each night to re-evaluate and possibly adjust the bid quantity for each dynamic source/dealer pair. In other examples, the process could be executed at other times, e.g., when a value that affects the computation is changed.

Dynamic bids are calculated for each source/dealer pair. A cost (in cents) and a "manual only" switch are stored in Is Manual 338 for each source/dealer pair in the Dynamic Ping Dealer table 330 of FIG. 3B. The "manual only" mode is used for sources for which fully automated bidding is not to be performed.

The process of FIG. 4 evaluates the previous day's performance for distinct applicants. At block 402, the process calculates the PPTC value for each dealer as described above with reference to the PPTC value 316 of FIG. 3. At block 404, the process determines the opportunity performance value for each source/dealer pair. The opportunity performance value is the ratio of received posts to accepted pings. In one example, the opportunity performance value for each source/dealer pair is calculated by dividing the number of received posts by the number of accepted pings associated with the lead generator identified by the source value.

It is assumed that if a post is being received for every accepted ping from a particular source, the sales lead provider is bidding above competition. If a post is not being received for every accepted ping, the sales lead provider is not bidding as high as its competition. However, this may not be a completely accurate assumption. As a result of the network style interconnection of sales lead providers, a lead generated by one provider may result in pings for the same lead being received from multiple sources. Even if the sales lead provider is the highest bidder to all sources, a post will be received from only one of the sources, creating the appearance of reduced opportunity performance from the other sources. This effect tends to drive bidding up and is mitigated by managing the MCP value.

Once the PPTC value for each dealer and the OP value for each source/dealer pair are known, a cost delta grid is consulted at block 406 to determine a delta amount by which the source/dealer cost should change. In one example, this cost delta grid is two-dimensional, with the dimensions being PPTC value and OP value. However, the grid may have other dimensions, such as source priority/quality or post per application conversion ratio.

At block 408, the delta amount corresponding to the PPTC value and OP value is read from the grid and added to the source/dealer cost (i.e., the price to be offered for sales leads). An example grid is shown below, with the costs in cents:

In one example, after the lookup, several further adjustments are made. First, if the source/dealer margin is within ten percent of the fixed-price generator margins, the OP value is less than 25 percent and the PPTC value is greater than 95 percent, the bid is increased by 50 cents. This adjustment prevents inexpensive dynamic sources from becoming inactive. Then any new bids that exceed MCP value are set to the MCP value.

Figure 5:
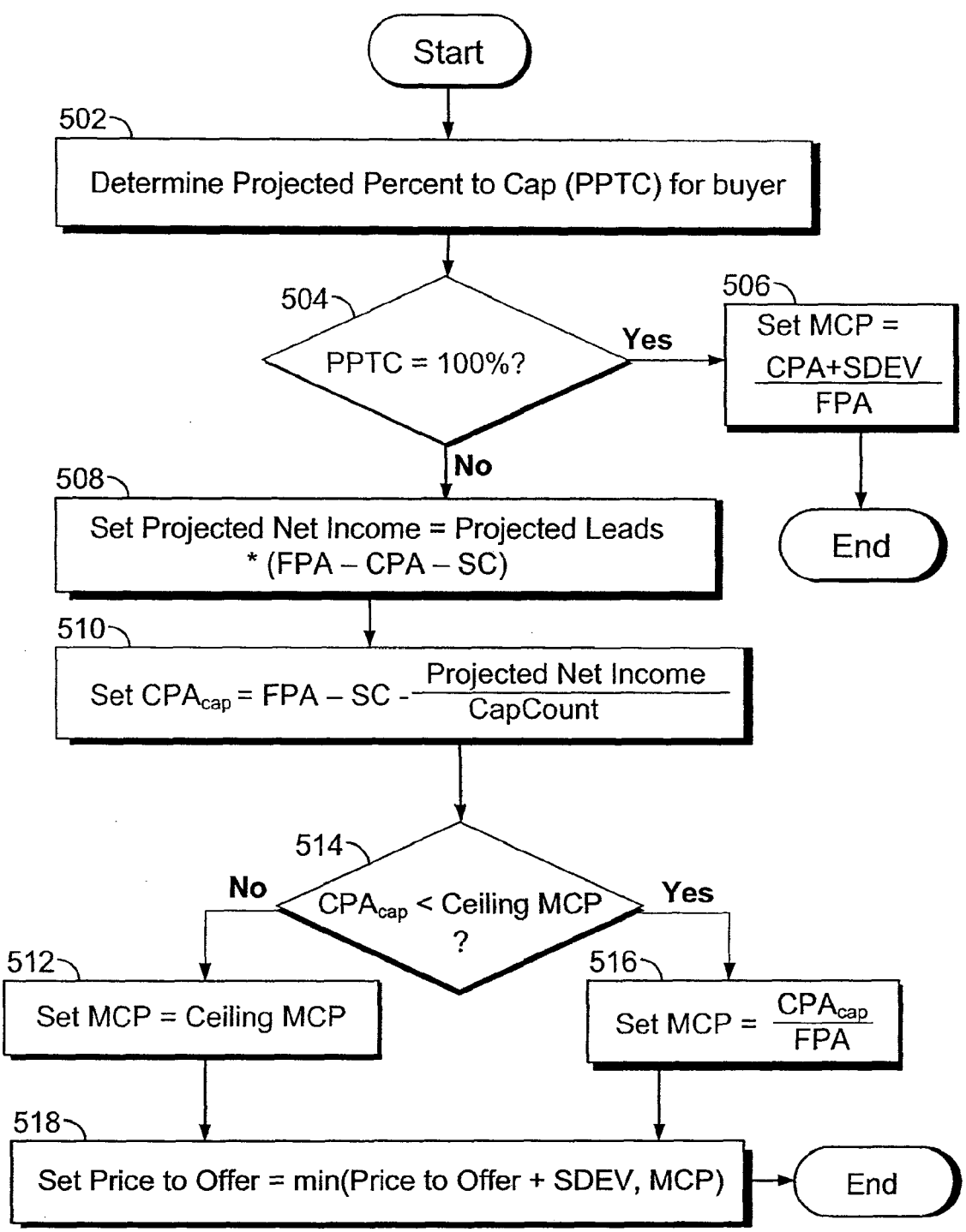
FIG. 5 is an illustrative flow diagram of a process for generating a maximum cost percentage value in accordance with embodiments of the invention.

FIG. 5 is an illustrative flow diagram of a process for generating a MCP value in accordance with embodiments of the invention: A MCP value is associated with each dealer. The MCP value represents a minimum acceptable margin to be retained by the sales lead provider. For example, if the MCP value is 80%, then the sales lead provider is willing to pay up to $24 to buy a sales lead with a $30 selling price. The MCP value is adjusted approximately weekly using the maximum cost percentage generation logic of FIG. 5.

When a sales lead provider receives a ping, the MCP value is consulted. For fixed price sources, if the fixed price is not at or below the MCP value, the sales lead provider will not accept the sales lead for the corresponding dealer. For dynamic price sources, the sales lead provider will not return a price or tier greater than the MCP value.

This process uses the projected percentage to cal (PPTC) value to determine whether or not to adjust MCP value. In one example, for each active internet dealer, the process determines the PPTC value at block 502 as described above with reference to the PPTC value 316 of FIG. 3. The process also determines the average cost per app (CPA), average fee per app (FPA) and the standard deviation of cost per app (SDEV), and uses these values to update the MCP value.

Block 504 determines if a particular dealer for which the process is executing is projected to cap. A dealer is projected to cap if the projected percentage to cap value associated with that dealer is equal to or substantially equal to 100%. In one example, a value is substantially equal to 100% if the value is slightly less than or slightly greater than 100%, e.g., within 1% of 100%, or within some other threshold percentage of 100%. Therefore, in one example, a value of 99% or 101% may be considered substantially equal to 100%. Similarly, a

|  |  | Opportunity Percent | | | | | | | | |
|---|---|---|---|---|---|---|---|---|---|---|
|  |  | 0%-25% | 25%-50% | 50%-65% | 65%-75% | 75%-85% | 85%-90% | 90%-95% | 95%-99% | 99%-100% |
| Percent to Cap | 0%-25% | 100 | 100 | 75 | 75 | 50 | 50 | 25 | 0 | 0 |
|  | 25%-50% | 75 | 75 | 75 | 50 | 50 | 25 | 25 | 0 | 0 |
|  | 50%-65% | 75 | 75 | 50 | 50 | 25 | 25 | 0 | 0 | −25 |
|  | 65%-75% | 50 | 50 | 50 | 25 | 25 | 0 | 0 | 0 | −25 |
|  | 75%-85% | 50 | 50 | 25 | 25 | 0 | 0 | −25 | −25 | −50 |
|  | 85%-90% | 25 | 25 | 25 | 0 | 0 | −25 | −25 | −50 | −50 |
|  | 90%-95% | 25 | 25 | 0 | 0 | −25 | −25 | −50 | −50 | −75 |
|  | 95%-99% | 0 | 0 | −25 | −25 | −50 | −50 | −75 | −75 | −75 |
|  | 99%-100% | 0 | −25 | −25 | −50 | −50 | −75 | −75 | −100 | −100 |

As an example, consider a source/dealer pair with a current bid of 1500, a PPTC value of 76% and OP value of 53%. The grid lookup yields the delta amount 25, and the new adjusted bid is 1525 (1500+25).

value that is less than 100% by more than a threshold value is "substantially less" than 100%. Therefore, 99% or 99.9% may be considered substantially less than 100%, depending upon the particular threshold value selected.

The cost of an application (i.e., sales lead) is the amount paid by the sales lead provider to acquire the application. The fee for an application (i.e., sales lead) is the amount charged by the sales lead provider when selling the application, e.g., to a dealer or wholesaler. The average CPA associated with a dealer is the average cost paid by the sales lead provider for applications sold to that dealer in a particular time period, such as the current month.

The average FPA associated with a dealer is the average fee paid by the dealer for applications sold to that dealer in a particular time period, such as the current month. For dealers who are projected to cap, i.e., dealers for which the percentage to cap value substantially corresponds to 100%, the process sets the MCP value to (CPA+SDEV)/FPA at block 506. The standard deviation of cost per app (i.e., SDEV) is used to determine the price because this standard deviation reflects the conditions of the particular market. Setting the MCP value to (CPA+SDEV)/FPA excludes the most expensive leads while still keeping most lead prices active.

For dealers who are not projected to cap, i.e., dealers for which the projected percentage to cap value is substantially less than 100%, the process calculates a higher MCP value. At block 508, the process determines the projected net for the month or time period at the current app rate. This calculation includes both the sales lead provider's cost to the source and the sales lead provider's sales commission (SC). Then, the process uses this value to determine what bid cost would return the same projected net if cap were to be reached. This is the maximum that should be bid (MAXBID, i.e., CPA when ProjectedSales leads=CapCount), since any higher bid would result in less net profit.

Projected Net Income=Projected Sales leads*(FPA−CPA−SC)

MAXBID=(FPA−SC)−(Projected Net Income/CapCount)

Block 508 determines the Projected Net Income according to the first formula, and block 510 determines the MAXBID (i.e., CPA when Projected Sales leads=CapCount) according to the second formula above.

For dealers where MAXBID is less than the ceiling MCP value, MCP value is set to MAXBID/FPA at block 516. For dealers where MAXBID is greater than the ceiling MCP value, the MCP value is set to the ceiling MCP value at block 512. At block 518, for dealers not projected to cap, the dealer's dynamic source bid is set to either the bid's current value+SDEV or MCP value, whichever is lower. SDEV is used as a price determination because it reflects the conditions in the particular market.

Figure 6:
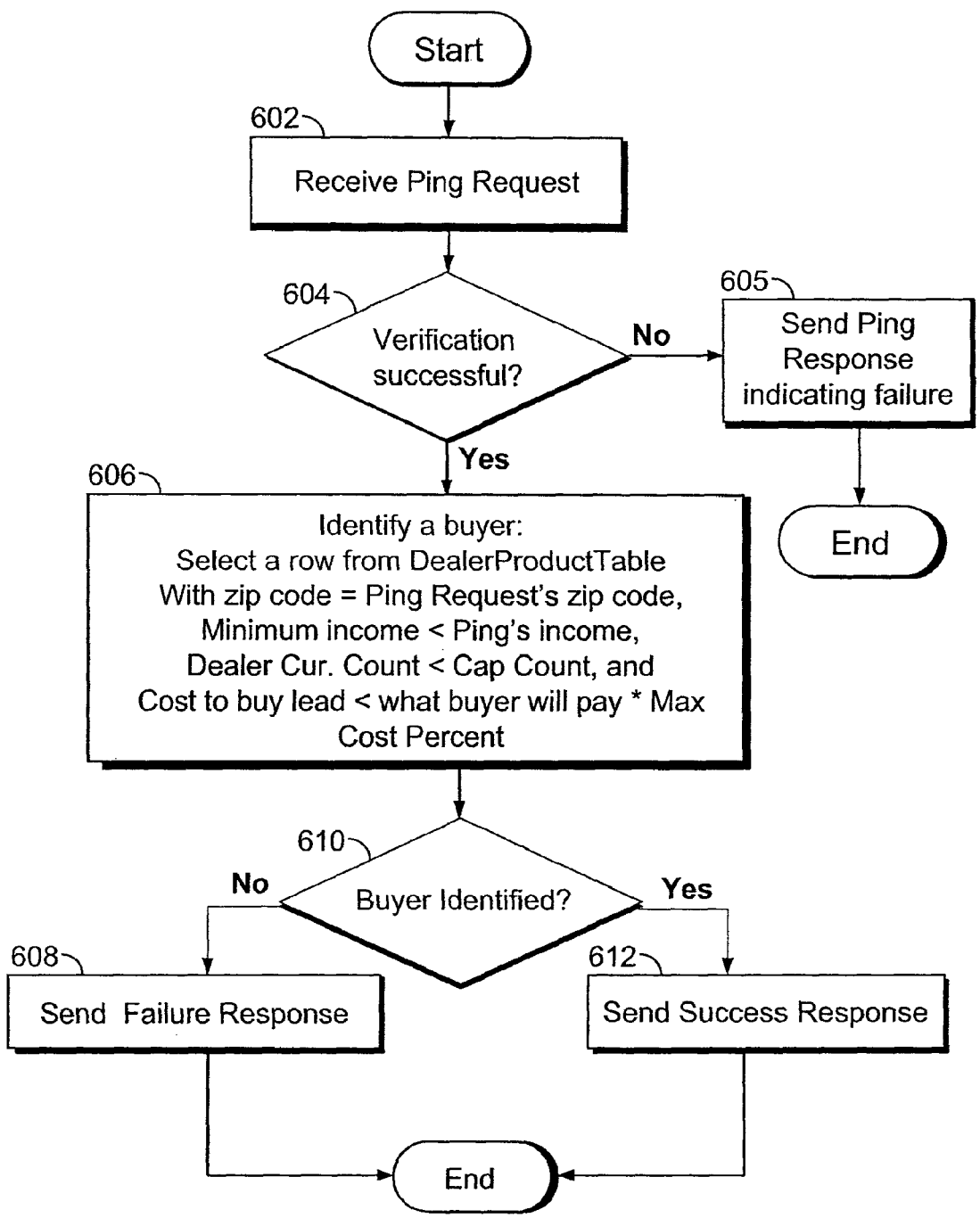
FIG. 6 is an illustrative flow diagram of a process for processing ping requests in accordance with embodiments of the invention.

FIG. 6 is an illustrative flow diagram of a process for processing ping requests in accordance with embodiments of the invention. A ping, if successful, results in a post being sent from the seller to a selected buyer. If the post is accepted by the buyer, a sales lead is sold. As described above, there are three channels for receiving sales leads from sellers: fixed price, dynamic tier and dynamic price. The three channels may have separate interfaces, but they typically follow the same format. When a ping request is received, e.g., by VB.NET code executed as part of the sales lead provider 202 of FIG. 2, the code looks for a retail dealer to accept the sales lead. Then, depending on the source setup, if no retail dealer is found, the code may search wholesale partners for placement of the sales lead.

The ping processing logic shown in FIG. 6 will return success if the login is validated, the SSN is not a duplicate, and a retail dealer exists that will accept an application with the supplied income. The login validation and SSN check are performed at block 602. If that validation and verification fails at block 604, block 605 sends a ping response indicating failure, and the process ends.

Block 606 identifies a buyer by selecting a row of data from the dealer product table (330). The row of data corresponds to a particular buyer. Block 606 verifies that the buyer (i.e., dealer) is under cap and not limited by a regulator. Additionally, block 606 ensures that the ping price is at or below the MCP value. For fixed price channels, block 606 verifies that the channel cost is equal to or less than (dealer fee)*MCP. For dynamic sources, block 606 looks up the price in the dynamic ping price table (330) of FIG. 3B. If no price is found, the cost is set to half the dealer fee (the selling price) and an entry is inserted into the dynamic ping price table. For dynamic price channels, this price is then compared to the MCP value, and if the cost is greater than MCP, it is lowered to MCP before it is returned. For dynamic tier channels, the price is compared to the costs for all tiers of this source. The tier that is closest to the cost without exceeding the MCP value is returned. If all tiers exceed MCP value, then a failure response is sent.

The conditions in block 606 correspond to the requirements for an acceptable ping request, i.e., that the ping request matches the buyer's demographics requirements. For example, the buyer's demographic requirements may be that that the ping request have a specific zip code, that the income specified in the ping request is greater than or equal to a minimum income (e.g., the income specified in the Dealer Product row, such as Min Income 313 of Dealer Product table 300). Additionally, the requirements for an acceptable ping request may include the dealer being under its cap (i.e., the dealer's Current Count of sales leads is less than its Cap Count), and the cost to buy a sales lead being less than the price the buyer will pay multiplied by the MCP.

In one example, if the lead provider 202 receives and successfully processes a ping request (i.e., the login is successfully validated, the social security number is not a duplicate, and a retail dealer will accept an application with this supplied income), then the ping processing logic 210 generates a session identifier (SessionId) and returns the SessionId to the source in a ping response. This SessionId is included in the posting of a sales lead both for security purposes and to identify the dealer who will get the lead and agreed cost of the lead.

Block 610 determines if block 606 successfully identified a buyer that matches the ping request. If so, block 612 sends a ping response indicating success. Otherwise, if no buyer was identified, or the ping request cannot be successfully processed for any other reason, block 608 sends a ping response indicating failure. The ping response is typically a message sent via the computer network back to the network host from which the ping request was received in block 602.

Figure 7:
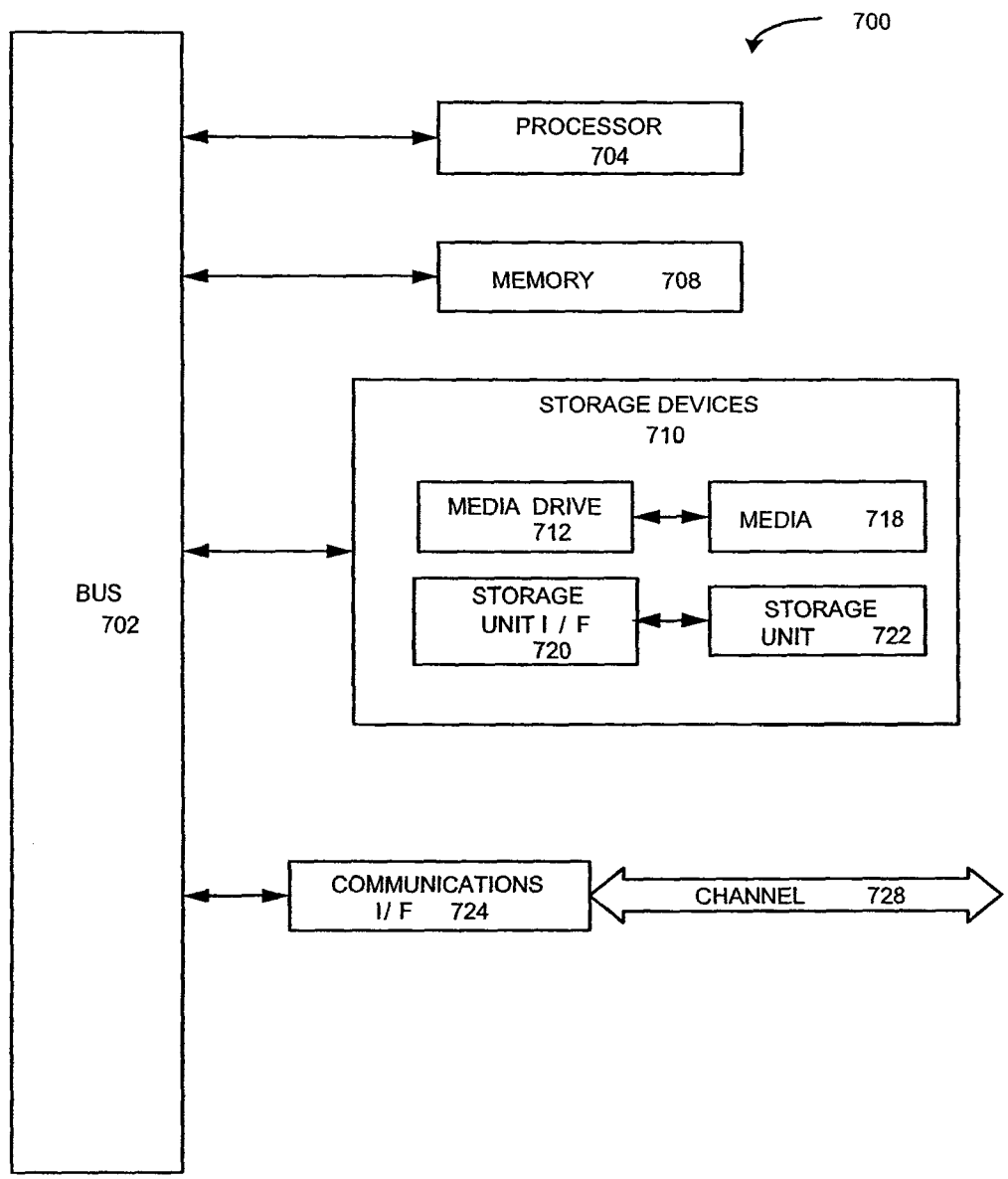
FIG. 7 is an illustrative drawing of an exemplary computer system that may be used in accordance with some embodiments of the invention.

FIG. 7 is an illustrative drawing of an exemplary computer system that may be used in accordance with some embodiments of the invention. FIG. 7 illustrates a typical computing system 700 that may be employed to implement processing functionality in embodiments of the invention. Computing systems of this type may be used in clients and servers, for example. Those skilled in the relevant art will also recognize how to implement the invention using other computer systems or architectures. Computing system 700 may represent, for example, a desktop, laptop or notebook computer, handheld computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communication medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory ("ROM") or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 718, may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a USB port), a PCMCIA slot and card, etc. Software and data transferred via communications interface 724 are in the form of signals which can be electronic, electromagnetic, optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 708, storage device 718, or storage unit 722. These and other forms of computer-readable media may be involved in storing one or more instructions for use by processor 704, to cause the processor to perform specified operations. Such instructions, generally referred to as "computer program code" (which may be grouped in the form of computer programs or other groupings), when executed, enable the computing system 700 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A computer enabled method of adjusting, by an online market provider of sales leads, a price to be offered to a seller of sales leads for a sales lead, wherein the adjusting is based upon past performance of a buyer, comprising:

determining, by a processor, a projected percent to cap value for the buyer based upon a rate, wherein:

the rate is based upon a number of sales leads accepted by the buyer in a current billing period and upon a cap, and the cap is associated with the buyer for the current billing period and indicates the maximum quantity of sale leads to be accepted by the buyer in the current billing period;

determining, by the processor, an opportunity performance value associated with the buyer based upon a ratio of received posts to accepted pings, wherein:

the accepted pings represent interest in sales leads, the accepted pings were sent by the online market provider and received by the seller of sales leads, and the received posts represent offers to sell sales leads, the received posts were sent by the seller of sales leads and received by the online market provider;

determining, by the processor, a delta amount based upon the percent to cap value and the opportunity performance value; and adjusting, by the processor, the price to be offered, by the online market provider of sales leads, for the sales lead by the delta amount.

2. The method of claim 1, further comprising:

receiving a ping request from the seller, wherein the ping request includes demographic information associated with the sales lead; and identifying the buyer, wherein the buyer is associated with the demographic information, the buyer accepts sales leads having the income associated with the sales lead, and the buyer is under its cap.

3. The method of claim 2, further comprising:

generating a ping response for dynamic price sources, wherein if the buyer is successfully identified, the ping response indicates success and includes the price to be offered.

4. The method of claim 2, wherein the demographic information comprises a zip code, a social security number, an income, or a combination thereof.

5. The method of claim 1, further comprising:

storing the price to be offered in a memory location in association with the buyer.

6. The method of claim 1, wherein the sales lead comprises an application for credit.

7. The method of claim 1, wherein the buyer comprises an automobile dealer.

8. The method of claim 1, wherein determining the projected percent to cap value comprises multiplying a current sales lead count by the number of days in the current billing period to obtain a first result, dividing the first result by the current numeric day of the current billing period to obtain a second result, and dividing the second result by the cap associated with the buyer.

9. The method of claim 1, wherein determining the opportunity performance value associated with the buyer comprises dividing a number of posts received from the buyer by a number of pings accepted from the buyer.

10. The method of claim 1, wherein determining the delta amount comprises selecting a row from a table, wherein the projected percent to cap value is between a first upper bound and a first lower bound associated with the row, and wherein the opportunity performance value is between a second upper bound and a second lower bound associated with the row, and wherein the delta amount is associated with the row.

11. The method of claim 1, wherein adjusting the price of the sales lead by the delta amount comprises adding the delta amount to the price of the sales lead.

12. The method of claim 1, further comprising setting the price of the sales lead to a maximum cost percentage value if the price of the sales lead is greater than the maximum cost percentage value.

13. The method of claim 1, further comprising increasing the price by an incremental factor if a margin associated with the buyer is within a first percentage of a standard margin, the opportunity performance value is less than a second percentage, and the percent to cap value is greater than a cap threshold.

14. The method of claim 13, wherein the incremental factor comprises a fraction of a dollar, the first percentage is between 1% and 10%, the second percentage is between 1% and 10%, and the cap threshold is between 80% and 100%.

15. A non-transitory computer-readable storage medium having computer-executable instructions for adjusting, by an online market provider of sales leads, a price to be offered to a seller of sales leads for a sales lead, wherein the adjusting is based upon past performance of a buyer, the computer-executable instructions comprising instructions for:

determining a projected percent to cap value for the buyer based upon a rate, wherein:

the rate is based upon a number of sales leads accepted by the buyer in a current billing period and upon a cap, and the cap is associated with the buyer for the current billing period and indicates the maximum quantity of sale leads to be accepted by the buyer in the current billing period;

determining an opportunity performance value associated with the buyer based upon a ratio of received posts to accepted pings, wherein:

the accepted pings represent interest in sales leads, the accepted pings were sent by the online market provider and received by the seller of sales leads, and the received posts represent offers to sell sales leads, the received posts were sent by the seller of sales leads and received by the online market provider;

determining a delta amount based upon the percent to cap value and the opportunity performance value; and adjusting the price to be offered, by the online market provider of sales leads, for the sales lead by the delta amount.

16. The computer-readable storage medium of claim 15, further comprising instructions for:

receiving a ping request from a seller, wherein the ping request includes demographic information associated with the sales lead; and identifying the buyer, wherein the buyer is associated with the demographic information, the buyer accepts sales leads having the income associated with the sales lead, and the buyer is under its cap.

* * * * *